(12) United States Patent
Qawami et al.

(10) Patent No.: US 11,592,808 B2
(45) Date of Patent: Feb. 28, 2023

(54) METHODS, SYSTEMS, ARTICLES OF MANUFACTURE AND APPARATUS TO IMPROVE BOUNDARY EXCURSION DETECTION

(71) Applicant: Intel Corporation, Santa Clara, CA (US)

(72) Inventors: Shekoufeh Qawami, El Dorado Hills, CA (US); Chaitanya Sreerama, Hillsboro, OR (US); Hassnaa Moustafa, Portland, OR (US); Rita Wouhaybi, Portland, OR (US); Nadine L. Dabby, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1012 days.

(21) Appl. No.: 16/144,840

(22) Filed: Sep. 27, 2018

(65) Prior Publication Data

US 2019/0049933 A1 Feb. 14, 2019

(51) Int. Cl.
*G06F 30/20* (2020.01)
*G05B 19/418* (2006.01)
*G05B 13/04* (2006.01)

(52) U.S. Cl.
CPC ....... *G05B 19/4188* (2013.01); *G05B 13/041* (2013.01); *G05B 19/4183* (2013.01); *G05B 19/4184* (2013.01); *G05B 2219/31356* (2013.01); *G05B 2219/32182* (2013.01)

(58) Field of Classification Search
CPC ............ G05B 19/4183; G05B 19/4188; G05B 19/4184; G05B 13/041
USPC ......................................................... 706/12
See application file for complete search history.

(56) References Cited

U.S. PATENT DOCUMENTS

| 5,835,891 A | * | 11/1998 | Stoneking | G01R 31/318583 |
| | | | | 702/117 |
| 2018/0089864 A1 | * | 3/2018 | Gindele | A61B 6/5258 |
| 2018/0321719 A1 | * | 11/2018 | Munjal | G06F 1/206 |

\* cited by examiner

*Primary Examiner* — Andre Pierre Louis
(74) *Attorney, Agent, or Firm* — Hanley, Flight & Zimmerman, LLC

(57) ABSTRACT

Methods, apparatus, systems and articles of manufacture are disclosed to improve boundary excursion detection. An example apparatus to improve boundary excursion detection includes a metadata extractor to parse a first control stream to extract embedded metadata, a metadata label resolver to classify a boundary term of the extracted embedded metadata, a candidate stream selector to identify candidate second control streams that include a boundary term that matches the classified boundary term of the first control stream, and a boundary vector calculator to improve boundary excursion detection by calculating a boundary vector factor based on respective ones of the candidate second control streams that include the classified boundary term.

25 Claims, 8 Drawing Sheets

300 ⟶

| | X | $S_{Xn}$ | $B_X$ | $B_n$ |
|---|---|---|---|---|
| 310 ⟶ | $1_{TH}$ | 0.912 | 130 | 118.56 ⟵ 312 |
| | $1_{TL}$ | 0.912 | 120 | 109.44 |
| | $1_{PH}$ | 0.912 | 160 | 145.92 |
| | $1_{PL}$ | 0.912 | 178 | 162.33 |
| | $2_{TH}$ | 0.6865 | 105 | 72.08 |
| | $2_{TL}$ | 0.6865 | 51 | 35.011 |
| | $2_{PH}$ | 0.6865 | 120 | 82.38 |
| | $2_{PL}$ | 0.6865 | 60 | 41.19 |

METHODS, SYSTEMS, ARTICLES OF MANUFACTURE AND APPARATUS TO IMPROVE BOUNDARY EXCURSION DETECTION

FIELD OF THE DISCLOSURE

This disclosure relates generally to control systems, and, more particularly, to methods, systems, articles of manufacture and apparatus to improve boundary excursion detection.

BACKGROUND

In recent years, manufacturing and industrial environments have become more automated. Such environments include industrial equipment that is controlled by one or more control systems (e.g., process control systems). The equipment may include conveyor belts, chemical tanks, air and/or fluid pumps, heating equipment, welding equipment, robotics, injection mold equipment, etc. Additionally, the equipment typically has different types of configuration settings depending on the objective of the manufacturing environment. As such, the same type of equipment may be used in a first manufacturing environment with first settings, and that same type of equipment may be used in a second manufacturing environment with second settings that are different than the first.

BRIEF DESCRIPTION OF THE DRAWINGS

FIG. 3 is an example calculation table generated by the example boundary analyzer.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
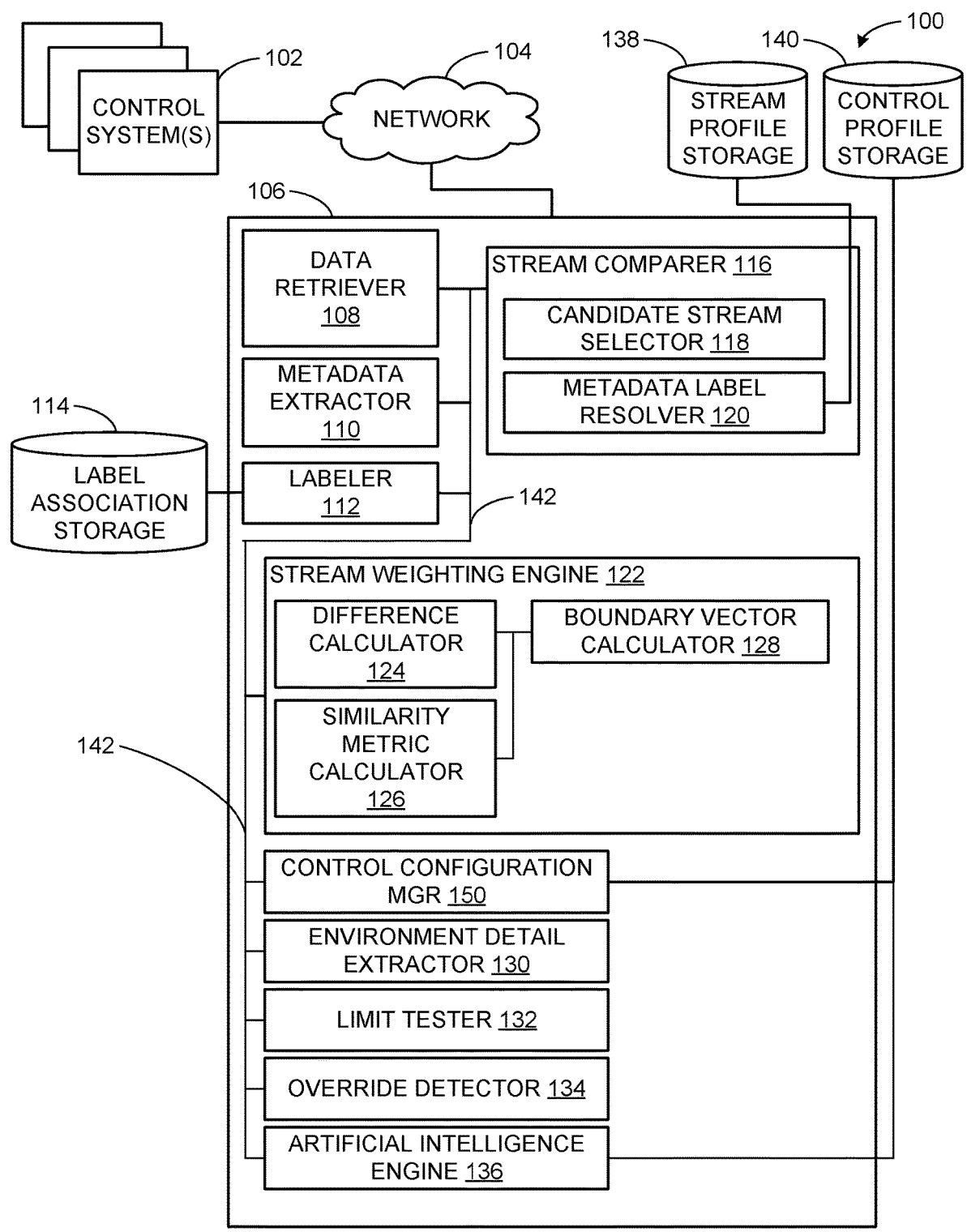
FIG. 1 is a schematic illustration of an example control environment including an example boundary analyzer constructed in accordance with the teachings of this disclosure to improve boundary excursion detection.

As used herein, "factory environments," "manufacturing environments," or "environments" include facilities that produce or augment one or more products/components (e.g., electronics, machines, chemicals, vehicles, etc.) using industrial equipment. Such nomenclature also refers to laboratory facilities/environments (e.g., facilities that facilitate product testing, chemical testing, etc.). The environments utilize many different types of equipment that is controlled by control systems (e.g., including but not limited to process control systems). The equipment may include conveyor belts, chemical tanks, air and/or fluid pumps, heating equipment, welding equipment, robotics, injection mold equipment, etc.

One environment may include any number of "lines," each of which is dedicated to a particular product to be manufactured. While the same type of equipment may exist on each manufacturing line, configuration settings for that equipment may differ. For example, a first manufacturing line may build a first product, or assembly of products that require a tank to supply high-pressure saline spray at a relatively high temperature (e.g., a pre-annealing process), while a second manufacturing line may build a second product in which the same type of tank supplies low-pressure rinse water at a relatively low temperature. As such, one or more environment personnel (e.g., process engineers, control engineers, process control personnel, factory line workers, etc.) are typically chartered with the responsibility of configuring operating limits for each piece of automated equipment on each line in a manner that (a) results in a product having acceptable quality standards and (b) ensures the safety of the environment.

The factory environments tend to be tightly controlled with a same control process running for an extended period of time. As disclosed above, a first product will require the assembly line to be configured, tuned and/or otherwise calibrated until a satisfactory configuration is identified. Once the satisfactory configuration is identified, that configuration (e.g., equipment operating limits, boundaries, etc.) tends to be used without further modification to allow any number of products to be manufactured. However, manufacturing environments are susceptible to control anomalies that require one or more adjustments to equipment setpoints. As used herein, boundaries (sometimes referred to as parameters) include a boundary name and a corresponding boundary value. The boundary names are indicative of equipment names or equipment output value names, while corresponding boundary values refer to equipment operating parameters (e.g., equipment setpoints), which have corresponding values (sometimes referred to as boundary values or parameter values) that are set to achieve a manufacturing objective and/or ensure operating safety. For example, a tank boundary may include a high pressure (e.g., maximum) operating limit to prevent excessive stress on the tank, ensure a satisfactory result on a manufactured part, and ensure safety of nearby factory personnel. While the tank boundary value may be configured by the manufacturing engineer during the month of February, environmental changes may occur due to weather variations during the relatively warmer months of July and August. Similarly, mechanical changes may occur due to wear, and electrical changes may occur due to demands from adjacent manufacturing activities (e.g., voltage fluctuations in view of adjacent equipment starts/stops, in which the adjacent equipment shares common powerline supplies). Accordingly, a previously calibrated tank boundary value (e.g., a pressure value) set in February may be exceeded (also referred to as an excursion) during the month of July (due to elevated environmental temperatures) and cause one or more abatement procedures to be invoked (e.g., sounding an alarm, opening a pressure release valve, turning off a heater, etc.).

While a boundary value excursion may occur, control personnel (e.g., process control personnel) may ignore, dismiss and/or otherwise cancel the abatement procedures because the excursion is not of a type (e.g., a magnitude) that is problematic. The boundary value excursion may be caused by errors associated with human discretion, such as process control personnel establishing, configuring and/or otherwise calibrating boundary values based on assumptions, heuristics and/or guesses. Such human discretion introduces one or more risks to product quality, assembly line efficiency and/or safety (e.g., human safety, equipment safety). When control personnel ignore, dismiss or otherwise silence an excursion, an efficiency metric of the assembly line is reduced, particularly when the excursion halts the assembly line process until authorized personnel can reset the excursion. In some examples, the process control personnel have the authorization to silence and/or otherwise override one or more corrective actions that result from the excursion, but such personnel may not have the authorization to adjust the problematic boundary value. In some examples, the process control personnel override the excursion event because equipment operating conditions are within proper specification limits, but such boundary values were incorrectly established due to human discretion or guesswork.

While many manufacturing settings operate in connection with expected boundary values measured in data streams that were established by human discretionary choices, examples disclosed herein improve boundary excursion detection by adjusting boundary values based on empirical data. In other words, examples disclosed herein improve boundary excursion detection by allowing boundary values (e.g., equipment setpoints) to be set in a more accurate manner such that if they are satisfied (e.g., exceeded), then the likelihood of a valid excursion is present. Additionally, examples disclosed herein establish boundary values based on similarity metrics derived from empirical data acquired from data streams of other process control environments (e.g., vetted streams considered to be operating with appropriately set boundary values). As used herein, streams (sometimes referred to herein as process control streams) refer to a set of process/operating data including any number of boundaries (e.g., boundary names (terms) and corresponding boundary values) having associated values from manufacturing equipment (e.g., sensor data) operating in a factory environment. As described in further detail below, streams may be characterized with one or more boundary vector(s) indicative of a set of boundary values that have been observed (e.g., a numerical value indicative of a signature, a maximum/minimum data pair, etc.). Examples disclosed herein solve problems associated with certain boundary values (e.g., threshold setpoint values that trigger alarms and/or safety protocols) that are set too conservatively and cause nuisance warnings, which lead to process inefficiency and/or process downtime. Additionally, examples disclosed herein solve problems associated with certain boundary values that are set in connection with human discretion and/or guesswork.

FIG. 1 is a schematic illustration of an example control environment 100. In the illustrated example of FIG. 1, the control environment 100 (e.g., a process control environment) includes any number of control systems 102 (e.g., process control systems), which may be geographically separated (e.g., a first process control system in a first building, a second process control system in a second building, a third process control system in a separate state/country, etc.). The example control systems 102 are communicatively connected via an example network 104 to an example boundary analyzer 106. In some examples, the boundary analyzer 106 is connected to the example control systems 102 via one or more other communication techniques/technologies, including, but not limited to a General Purpose Interface Bus (GPIB) (IEEE 488). The example boundary analyzer 106 includes an example data retriever 108, an example metadata extractor 110, and an example labeler 112 communicatively connected to an example label association storage 114. While the example label association storage 114 is shown in the illustrated example of FIG. 1 as directly connected to the example labeler 112, communication therebetween may occur in some examples via any other communication standard and/or technique (e.g., via the example network 104). Generally speaking, one or more components and/or data sources/storage of the illustrated example of FIG. 1 may be facilitated via direct connection and/or network connection(s).

The example boundary analyzer 106 of FIG. 1 also includes an example stream comparer 116, which includes an example candidate stream selector 118 and an example metadata label resolver 120 communicatively connected to the example label association storage 114, and an example stream profile storage 138. The example boundary analyzer 106 of FIG. 1 also includes an example stream weighting engine 122, which includes an example difference calculator 124, an example similarity metric calculator 126, and an example boundary vector calculator 128, which is communicatively connected to an example control profile storage 140. The example boundary analyzer 106 of FIG. 1 also includes an example control configuration manager 150, an example environment detail extractor 130, an example limit tester 132, an example override detector 134, and an example artificial intelligence (AI) engine 136. One or more of the components and/or storage (e.g., storage devices, databases, etc.) of the illustrated example of FIG. 1 are communicatively connected via one or more communication busses 142.

Figure 2:
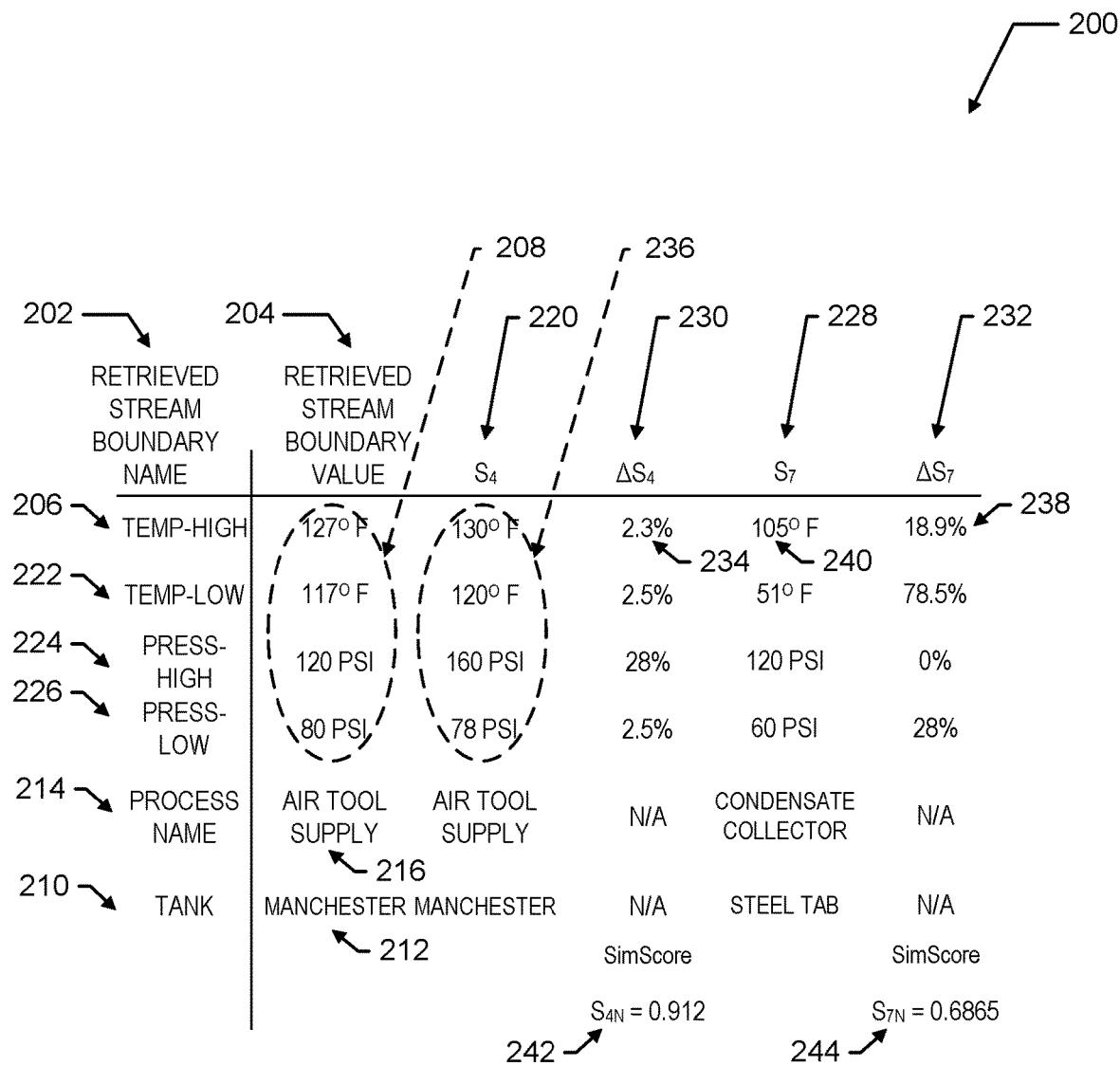
FIG. 2 is an example stream table generated by the example boundary analyzer.

In operation, the example data retriever 108 retrieves a stream, such as a process control stream from a manufacturing process from one of the example control systems 102. The example metadata extractor 110 parses the retrieved stream for process data and extracts associated metadata (e.g., metadata embedded within the retrieved stream—"embedded metadata") associated therewith. The example metadata extractor 110 is hardware that may be implemented as a means for parsing or a parsing means, in which the means for parsing and/or parsing means are hardware. In some examples, the metadata extractor 110 generates a table of extracted metadata (e.g., extracted embedded metadata). Metadata may include, but is not limited to alphanumeric data within a string of setpoint values indicative of process details, such as names of sensors, names of setpoints, equipment manufacturer serial numbers/model numbers, etc. FIG. 2 illustrates an example stream table 200 including example metadata extracted by the example metadata extractor 110. In the illustrated example of FIG. 2, the stream table 200 includes a retrieved stream boundary name column 202 that includes metadata boundary names, and a retrieved stream boundary value column 204 that includes corresponding values associated with metadata boundary names. In the retrieved stream boundary name column 202 of FIG. 2, boundary names include an example high-temperature boundary name 206 ("TEMP-HIGH") and a corresponding boundary value 208 ("127° F."). In some examples, the retrieved stream boundary name column 202 includes information indicative of a type of sensor or equipment, such as an example equipment type 210 ("Tank") and a corresponding value 212 ("Manchester"). The illustrated example of FIG. 2 also includes a process name 214 and an associated value 216 ("Air Tool Supply") indicative of a type of manufacturing activity. Other columns of the example stream table 200 of FIG. 2 will be discussed in further detail below.

The example metadata extractor 110 determines whether the retrieved stream is associated with a new process that was not previously analyzed by the example boundary analyzer 106. For example, the retrieved stream may include a boundary name in the retrieved stream boundary name column 202 entitled "New Stream" with an associated binary value (e.g., "Yes," "No," "True," "False," "0," "1," etc.). In the event that the retrieved stream is not associated with a new and/or otherwise unknown process (e.g., a binary value of "False"), further label resolution efforts may be bypassed. Generally speaking, boundary names of retrieved metadata are sourced from any number of independent sensor and/or equipment manufacturers that use unique nomenclature to identify one or more boundaries. For instance, a first manufacturer may refer to a temperature boundary as "TEMP," while a second manufacturer may refer to the temperature boundary as "Temperature." In the event that the retrieved stream is associated with a new and/or otherwise unknown process (e.g., a binary value of "True"), the example labeler 112 applies one or more nomenclature resolution techniques, such as Natural Language Processing (NLP) techniques and/or nomenclature lookup table information stored in the example label association storage 114. As such, any retrieved stream may be normalized to resolve unique nomenclature that is indicative of known boundary types. In some examples, such nomenclature resolution may be performed at a later stage of stream analysis, as described in further detail below.

The example stream comparer 116 compares the retrieved stream, sometimes referred to herein as the "current stream" to any number of stream profiles stored in the example stream profile storage 138. The example metadata extractor 110 selects a metadata boundary from the retrieved stream and the example candidate stream selector 118 identifies one or more candidate stream profiles that might be similar. For example, if the retrieved stream includes a boundary name "TEMP-HIGH," then the example candidate stream selector 118 flags only those previously stored streams in the example stream profile storage 138 that also include a similarly-named boundary. Because the retrieved stream may have any number of individual and/or otherwise unique boundary names, the example candidate stream selector 118 determines whether one or more additional/alternate boundary names are in the retrieved stream that have not yet been compared to profile streams stored in the example stream profile storage 138. The example candidate stream selector 118 is hardware that may be implemented as a means for identifying or an identifying means, in which the means for identifying and/or identifying means are hardware.

After the example candidate stream selector 118 identifies one or more candidate streams that have some amount/degree (e.g., a magnitude of similarity) of similarity to the retrieved stream (e.g., by virtue of at least one common boundary term/name), the example metadata label resolver 120 classifies boundary terms by applying a similarity calculation between boundary names. The example metadata label resolver 120 is hardware that may be implemented as a means for classifying or a classifying means, in which the means for classifying and/or classifying means are hardware. In some examples, the metadata label resolver 120 employs Natural Language Processing (NLP) techniques to determine whether a boundary name has one or more likely equivalents. For instance, a boundary name "TEMP" may be equated and/or otherwise matched to any variant related to a "temperature" boundary. In some examples, the metadata label resolver 120 employs lookup tables in addition to or instead of the example NLP techniques. When candidate streams having a degree of similarity are identified and boundary nomenclature is resolved and/or otherwise normalized, the example metadata label resolver 120 stores the matching streams for further analysis, such as storing the candidate matching streams to the example stream table 200 of FIG. 2.

Returning to the illustrated stream table 200 of FIG. 2, stream $S_4$ (220) is added by the example metadata label resolver 120 or the example candidate stream selector 118. The example stream $S_4$ (220) is selected because at least one of its boundaries relates to the high-temperature boundary 206, a low-temperature boundary 222, a high-pressure boundary 224, a low-pressure boundary 226, the process name 214, or the example equipment type 210. Similarly, the example metadata label resolver 120 or the example candidate stream selector 118 adds stream $S_7$ (228) to the example stream table 200 of FIG. 2 for having at least one matching boundary name.

Although two or more streams may have at least one common boundary name, a degree of similarity between such streams is determined by more than just a singular similar boundary name. The example candidate stream selector 118 selects one of the previously identified candidate streams that have at least one matching boundary name. Within the current stream, there may be one or more other matching boundary names having corresponding boundary values. As described above, the example stream table of FIG. 2 includes stream $S_4$ (220) and stream $S_7$ (228) that have at least one similar boundary name to the retrieved stream 202. Additionally, the example difference calculator 124 generates corresponding delta columns to identify a percent difference between one or more values of common boundary names. In the illustrated example of FIG. 2, the difference calculator 124 generates a delta-$S_4$ column 230 and a delta-$S_7$ column 232. Additionally, the example difference calculator 124 calculates an $S_4$ temp-high difference value 234 (e.g., 2.3%) that is based on a deviation between the TEMP-HIGH value 208 and a TEMP-HIGH value 236 associated with stream $S_4$ 220. Similarly, the example difference calculator 124 calculates an $S_7$ temp-high difference value 238 (e.g., a value difference of 22 degrees divided by average value of 116 degrees times 100=18.9%) that is based on a deviation between the TEMP-HIGH value 208 of the retrieved stream 204 and a TEMP-HIGH value 240 associated with stream $S_7$ 228. As described in further detail below, the relatively greater difference value in stream $S_7$ as compared to the difference value in stream $S_4$ for the same boundary name suggests that stream $S_4$ is more similar to the retrieved stream than $S_7$. The example difference calculator 124 is hardware that may be implemented as a means for calculating, a means for difference calculating, a difference calculating means or a calculating means, in which such means are hardware.

The example similarity metric calculator 126 calculates a stream similarity metric based on an aggregate of percent difference values for boundary values. In the illustrated example of FIG. 2, the example similarity metric calculator 126 calculates stream similarity metric in a manner consistent with example Equation 1.

$$S_{XN} = 100 - \frac{\Sigma(\% \text{ difference values})}{\# \text{ of matching parameters}}. \qquad \text{Equation 1}$$

In the illustrated example of Equation 1, $S_{XN}$ represents a similarity metric between stream X (e.g., a previously stored profile stream) and retrieved stream N (e.g., the current/new stream under analysis). Generally speaking, the similarity metric is indicative of a magnitude of similarity between streams. The example similarity metric calculator 126 calculates stream similarity metric $S_{4N}$ (242) having an example value of 0.912 based on the average percent difference values between the retrieved stream (N) and stream $S_4$ (e.g., the sum of values 2.3%, 2.5%, 28% and 2.5% divided by four matching boundaries between the retrieved stream and stream $S_4$). The example similarity metric calculator 126 also calculates stream similarity metric $S_{7N}$ (244) having an example value of 0.6865 based on the average percent difference values between the retrieved stream (N) and stream $S_7$ (e.g., the sum of values 18.9%, 78.5%, 0% and 28% divided by four matching boundaries between the new stream and stream $S_7$). Generally speaking, the relative differences between stream similarity metric $S_{4N}$ (242) (0.912) and similarity metric $S_{7N}$ (244) (0.6865) indicate that stream $S_4$ is more similar (because it is closer to unity) to the retrieved stream than stream $S_7$. As such, examples disclosed herein utilize characteristics of the more similar stream to a greater extent (e.g., weight more heavily) when modifying the retrieved stream, which is particularly helpful when the retrieved stream values/boundaries may have been set based on mere discretionary guesswork or heuristics. The example similarity metric calculator 126 is hardware that may be implemented as a means for calculating, a means for similarity metric calculating, a similarity metric calculating means, or a calculating means, in which such means are hardware.

The example boundary vector calculator 128 calculates a boundary vector factor (sometimes referred to as a "boundary vector," or a "factor") for the retrieved stream, in which the calculated factor adjusts the boundary values in a manner that better aligns with expected operating setpoints that will reduce nuisance alarms (e.g., nuisance boundary excursions), improve process efficiency and improve process safety. As described above, the retrieved stream (e.g., a stream of boundary setpoints for equipment from a process control system) may not be set and/or otherwise established correctly. In some examples, boundary values are equipment setpoints (e.g., maximum operating values, minimum operating values, etc.) that have not been configured in connection with empirical data or manufacturer-suggested guidance. In such circumstances, boundary values may be set in a manner that degrades process efficiency and/or elevates one or more safety risks associated with the equipment, process control system and/or factory environment. The example boundary vector calculator 128 is hardware that may be implemented as a means for calculating or a calculating means, in which the means for calculating and/or calculating means are hardware.

In some examples, the example boundary vector calculator 128 calculates the boundary vector factor based on the (relatively) most similar stream of the example stream table 200. As described above, stream $S_4$ exhibits the closest relative similarity to the retrieved stream because it has the largest relative similarity metric (0.912) (e.g., because it exhibits the relative lowest aggregate difference between matching boundary values). However, in some examples the boundary vector calculator 128 calculates the boundary vector factor in a manner consistent with example Equation 2.

$$B_n = \sum_{x=1}^{n-1} S_{xn} B_x. \qquad \text{Equation 2}$$

In the illustrated example of Equation 2, Bn represents a boundary vector for stream n (e.g., the retrieved stream of interest), Sxn represents a similarity metric between stream x and retrieved stream n, and Bx represents a boundary vector of stream x. Generally speaking, some streams and/or stream data stored in the example stream profile storage 138 include a boundary vector Bx, which may be indicative of a particular equipment setpoint value. However, in some examples, the boundary vector calculator 128 calculates the boundary vector factor in a manner consistent with example Equation 3.

$$B_n = \left(\frac{\sum_{x=1}^{n-1} S_{xn} B_x}{n}\right) \div 100. \qquad \text{Equation 3}$$

In the illustrated example of Equation 3, the boundary vector Bn for the stream is based on an aggregate consideration of boundary values of the retrieved stream and the candidate stream of interest x, as shown in FIG. 3. Additionally, the illustrated examples of Equation 2 and Equation 3 calculate boundary vector values in a manner proportionate to a similarity metric.

In the illustrated example of FIG. 3, the boundary vector calculator generates a calculation table 300 having a candidate stream boundary column 302 (stream x values, such as $1_{TH}$ indicative of the first candidate stream temperature-high boundary, $1_{TL}$ indicative of the first candidate stream temperature-low boundary, $2_{PH}$ indicative of the second candidate stream pressure-high boundary, etc.), a similarity metric column 304 having corresponding similarity metric values (Sxn), a stream-x boundary vector column 306 having corresponding boundary vector values Bx, and a stream-n boundary vector column 308 having corresponding boundary vector values for the retrieved stream n. In a manner consistent with example Equation 3, a first example row 310 calculates a Bn vector value corresponding to the example first candidate stream temperature-high boundary ($1_{TH}$) and, as described above, a corresponding similarity metric value of 0.912 was calculated in view of candidate stream x and retrieved stream n. As shown in the illustrated example of Equation 3, Bn vector values are calculated in a manner that is proportionate to a degree or quantity of similarity between the retrieved stream value(s) and candidate stream value(s). As such, the example boundary vector calculator 128 calculates a Bn vector value for the boundary associated with a high temperature as 118.56 degrees (312).

The example boundary vector calculator 128 repeats the aforementioned calculation in a manner consistent with example Equation 3 such that all common boundaries (and their corresponding values) between the retrieved stream and the candidate stream (x) are considered. These corresponding values are averaged and divided by 100 to generate the boundary vector factor, which is shown with example data of FIG. 3 as 0.9586 (314). The example control configuration manager 150 applies this boundary vector factor to respective boundary values of the retrieved stream as an adjustment factor (a boundary vector factor) in an effort to tailor setpoint values that improve process efficiency, safety and/or otherwise tailor such setpoint values using the benefit of empirical behaviors of previously stored streams in the example stream profile storage 138. In particular, the example control configuration manager 150 generates an updated stream (e.g., an updated process control stream) by applying the boundary vector factor to boundary values. Updated boundary values, thus, reduce a frequency of nuisance boundary excursion instances. Additionally, because new and/or current streams are iteratively analyzed by examples disclosed herein, continuous improvement of boundary values are realized, particularly in view of potentially changing environmental conditions (e.g., seasonal weather changes, equipment wear, etc.). The example control configuration manager 150 is hardware that may be implemented as a means for configuration, or a configuration means, in which such means are hardware.

While the aforementioned activity considers dynamic tailoring and/or modification of boundary values in connection with empirical stream data associated with streams similar to the retrieved stream of interest, examples disclosed herein also consider the effects of runtime behaviors. For example, during runtime of a control system one or more boundary values may be satisfied (e.g., exceeded) causing alarm and/or control change activity (e.g., stopping a process, slowing a process, activating safety shields, etc.). However, in the event that such boundary values were not initially set correctly, then control personnel may dismiss such alarms and/or controls as a nuisance. The nuisance may have a detrimental effect on control efficiency that examples disclosed herein overcome.

The example limit tester 132 determines whether a boundary value is exceeded and, if so, initiates corrective activity. As described above, corrective activity may be programmed by control systems to enact warnings, alarms and/or safety systems. After such corrective activity is performed, the example override detector 134 captures response activity (post excursion inputs) of the boundary value violation. Response activity includes override actions taken by process control personnel, such as silencing an alarm and/or restarting process activity. Response activity also includes acquiesce actions taken by process control personnel, such as acknowledgement activities and requests for corrective action and/or repair (e.g., requests for maintenance, observing threshold durations of sustained downtime after the boundary value violation, etc.). The example override detector 134 detects one or more post excursion inputs, such as alarm acceptance instructions, shut-down instructions, maintenance request instructions, override instruction(s), process shut-down instruction(s), etc. The example override detector 134 is hardware that may be implemented as a means for detecting, a means for override detecting, or an override detecting means, in which such means are hardware.

Generally speaking, examples disclosed herein capture and analyze response activity because it reveals useful information related to whether boundary values have been configured correctly. For example, repeated operator override behaviors of boundary value violations (excursions) indicate that such boundary values are not configured correctly. In some examples, process control personnel are aware of reasonable operating limits of process control equipment that may not have been considered by other personnel that originally established such boundary values. As such, the example override detector 134 feeds and/or otherwise forwards response activity to the example artificial intelligence engine 136. Based on one or more iterations of response activity (e.g., override, acquiesce, ignore, etc.), the example artificial intelligence engine 136 updates existing boundary values of the new/current stream in view of one or more detected patterns, in which such modified boundary values (e.g., candidate boundary value adjustments) may be saved in the example control profile storage 140.

Because the retrieved stream may be relatively new in a factory environment and/or process control system, the example stream comparer 116 determines whether the retrieved stream just analyzed has performed a threshold number of iterations. If not, then the retrieved stream is not flagged for distribution as a candidate stream to be used for similarity comparison purposes. Stated differently, the retrieved stream has not yet been vetted by examples disclosed herein until a threshold number of comparisons, adjustments and/or artificial intelligence pattern recognition instances have occurred. During each such iteration, boundary values are adjusted accordingly and a convergence occurs where magnitudes of each adjustment become smaller and smaller. On the other hand, when a threshold number of iterations of the retrieved stream have occurred, the example stream comparer 116 flags the stream and/or the corresponding boundary values for distribution, which can be used to help tailor and/or otherwise configure other/future new streams and corresponding boundary values.

Examples disclosed herein also assist control personnel when initially configuring a new manufacturing and/or other control environment that has not previously been established. For instance, to combat problems associated with control personnel establishing boundary values absent empirical basis, examples disclosed herein provide starting-point boundary values based on similar control systems that have previously been established and contain similar control equipment and/or control objectives. The example control configuration manager 150 determines whether a new environment is to be configured and, if so, the example environment detail extractor 130 retrieves environment details. Environment details include, but are not limited to a list of control equipment, manufacturer names of the control equipment, model/serial numbers of the control equipment, nomenclature designating an intended purpose of the control equipment (e.g., air tool supply, condensate collector, etc.), etc. The example environment detail extractor 130 selects a match between the environment detail and one or more control profiles stored in the example control profile storage 140 that have previously been flagged for distribution.

Boundary values from matching control profiles are used by the example control configuration manager 150 to configure the new control system and/or equipment therein with boundary values. The example control configuration manager 150 then enables a runtime mode for the newly established control system.

While an example manner of implementing the example control environment 100 of FIG. 1 is illustrated in FIGS. 1-3, one or more of the elements, processes and/or devices illustrated in FIGS. 1-3 may be combined, divided, re-arranged, omitted, eliminated and/or implemented in any other way. Further, the example data retriever 108, the example metadata extractor 110, the example labeler, the example stream comparer 116, the example candidate stream selector 118, the example metadata label resolver 120, the example stream weighting engine 122, the example difference calculator 124, the example similarity metric calculator 126, the example boundary vector calculator 128, the example control configuration manager 150, the example environment detail extractor 130, the example limit tester 132, the example override detector 134, the example artificial intelligence engine 136 and/or, more generally, the example boundary analyzer 106 of FIG. 1 may be implemented by hardware, software, firmware and/or any combination of hardware, software and/or firmware. Thus, for example, any of the example data retriever 108, the example metadata extractor 110, the example labeler, the example stream comparer 116, the example candidate stream selector 118, the example metadata label resolver 120, the example stream weighting engine 122, the example difference calculator 124, the example similarity metric calculator 126, the example boundary vector calculator 128, the example control configuration manager 150, the example environment detail extractor 130, the example limit tester 132, the example override detector 134, the example artificial intelligence engine 136 and/or, more generally, the example boundary analyzer 106 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data retriever 108, the example metadata extractor 110, the example labeler, the example stream comparer 116, the example candidate stream selector 118, the example metadata label resolver 120, the example stream weighting engine 122, the example difference calculator 124, the example similarity metric calculator 126, the example boundary vector calculator 128, the example control configuration manager 150, the example environment detail extractor 130, the example limit tester 132, the example override detector 134, the example artificial intelligence engine 136 and/or, more generally, the example boundary analyzer 106 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example boundary analyzer 106 of FIG. 1 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the boundary analyzer 106 of FIG. 1 is shown in FIGS. 4-7. The machine readable instructions may be an executable program or portion of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 4-7, many other methods of implementing the example boundary analyzer 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
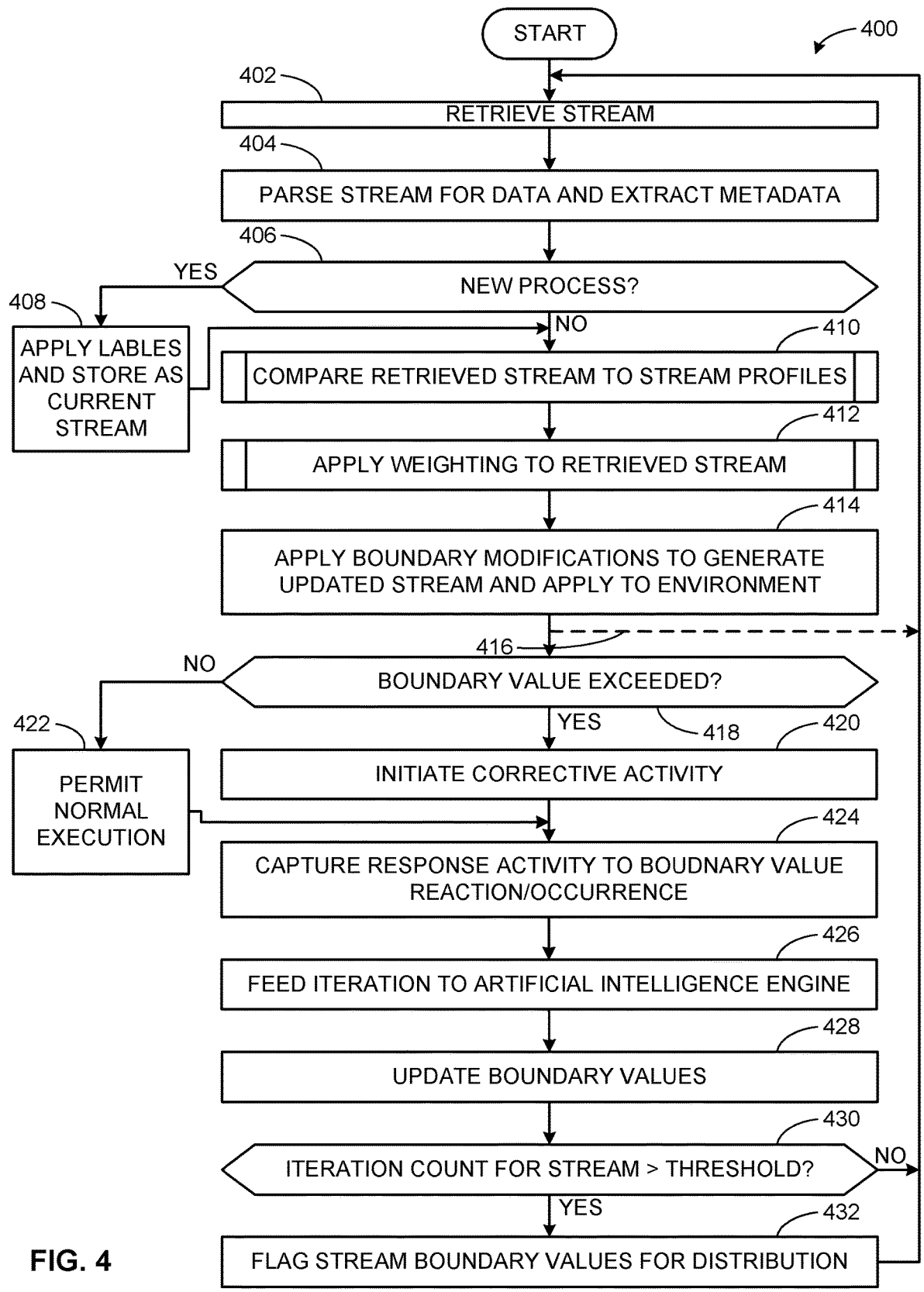
FIGS. 4-7 are flowcharts representative of machine readable instructions which may be executed to implement the example boundary analyzer of FIG. 1 to improve boundary excursion detection.

The program 400 of FIG. 4 includes block 402, in which the example data retriever 108 retrieves a stream or stream data from a process (e.g., retrieved from a control system 102 in a manufacturing environment). The example metadata extractor 110 parses the retrieved stream for process data and extracts the same (block 404). The example metadata extractor 110 also determines whether the retrieved stream is a new process that has not yet been examined to apply labels (block 406). In the event the retrieved stream has not yet been examined, as determined by an example flag indicating the same, the example labeler 112 applies labels to the data within the retrieved stream (block 408), such as labels associated with equipment, equipment boundaries, etc. In some examples, the labeler 112 employs one or more lookup tables stored in the example label association storage 114 to resolve and/or otherwise normalize nomenclature of the retrieved stream. As described above, because a retrieved stream may be evaluated by the example boundary analyzer 106 any number of times/iterations, resolved nomenclature (e.g., common names for boundaries) may be written to one or more data elements of the retrieved stream for future analysis, thereby bypassing repeated labeling efforts for future iterations.

After the example labeler 112 applies labeling efforts (block 408), or if the example metadata extractor 110 determines that labeling efforts are not needed (block 406) (e.g., because such labeling efforts were previously performed and applied to the retrieved stream), the example stream comparer 116 compares the retrieved (current) stream to stream profiles (block 410). As described above, at least one objective of the example stream comparer 116 is to generate and/or otherwise identify a set of streams that are similar to the current stream. Once similar streams have been identified, examples disclosed herein use such empirical data to calculate boundary vectors and/or other factors to enable modification and/or tailoring of boundary values of the retrieved stream so that it reflects a degree of consistency with known streams that operate well in their respective environments.

Figure 5:
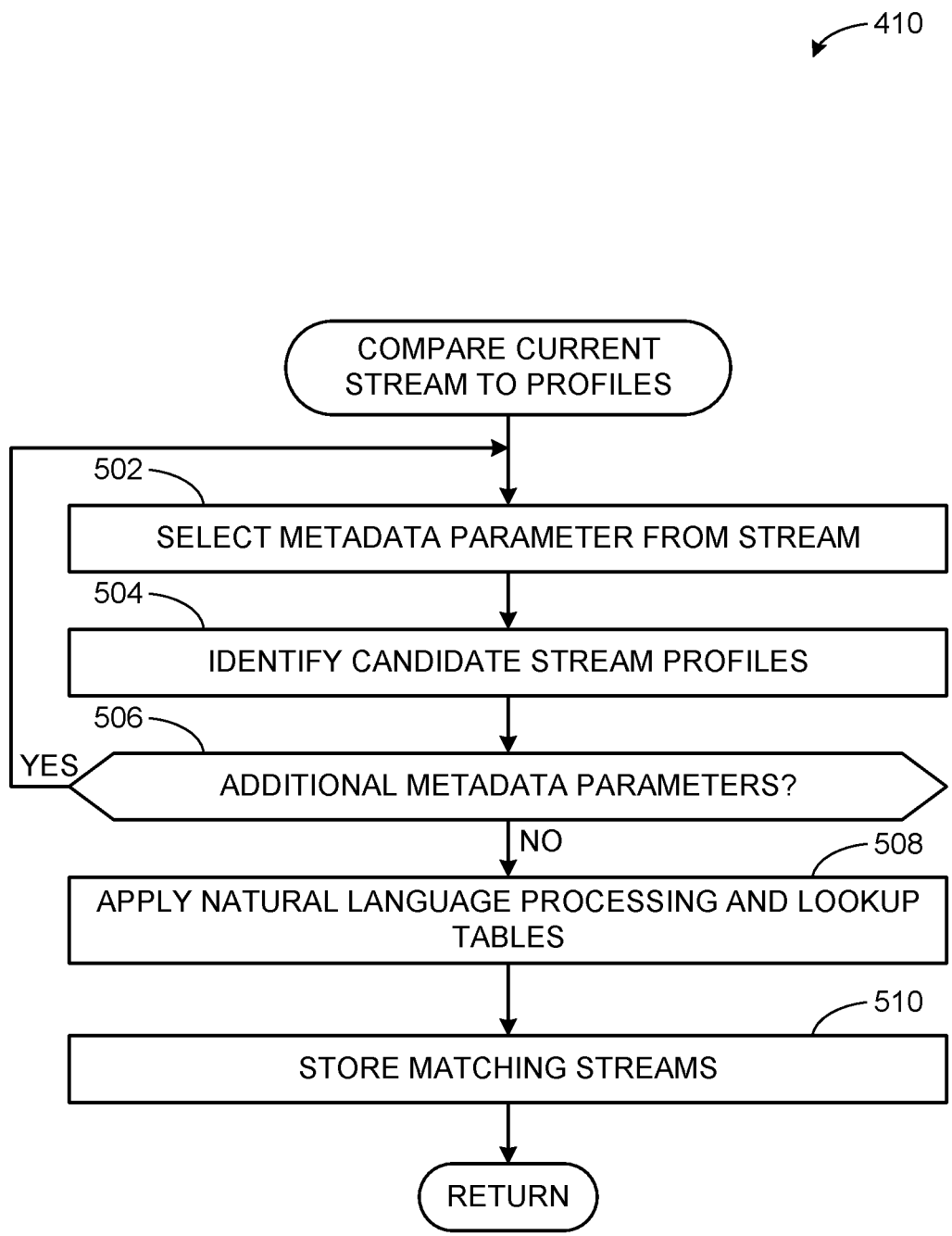

FIG. 5. illustrates additional detail in connection with example block 410 of FIG. 4. In the illustrated example of FIG. 5, the metadata extractor 110 selects a metadata parameter/boundary name from the retrieved stream (block 502). Retrieved streams may have any number of boundaries (e.g., parameters having associated metadata indicative of a name of the boundary), in which each boundary name has a corresponding value (e.g., a setpoint operating condition for control equipment). The example candidate stream selector 118 identifies candidate stream profiles stored in the example stream profile storage 138 (block 504). As described above, candidate stream profiles are identified by the example candidate stream selector 118 if at least one metadata boundary name matches a boundary name of the retrieved stream (block 504). The example metadata extractor 110 determines whether there are one or more additional metadata parameters of the retrieved stream that have not yet been analyzed (block 506). If so, control returns to block 502.

Although the retrieved stream may have been evaluated by the example labeler 112 to apply known labels to resolve and/or otherwise normalize nomenclature of the stream, another label resolution effort is applied by the metadata label resolver 120 after candidate stream profiles have been identified. For instance, the example stream profile storage 138 and/or the example control profile storage 140 may be updated by one or more concurrent boundary analysis processes, in which newly distributed streams have been added with alternate parameter nomenclature. To ensure such nomenclature is current and/or otherwise resolved in view of the retrieved stream, the example metadata label resolver 120 applies Natural Language Processing (NLP) techniques and/or lookup tables to the identified candidate streams (block 508). Matches that are discovered by the example metadata label resolver 120 are stored as candidate matching streams (block 510) to be further evaluated so that proportional weighting can be applied based on a degree of similarity. Control then returns to block 412 of FIG. 4.

Figure 6:
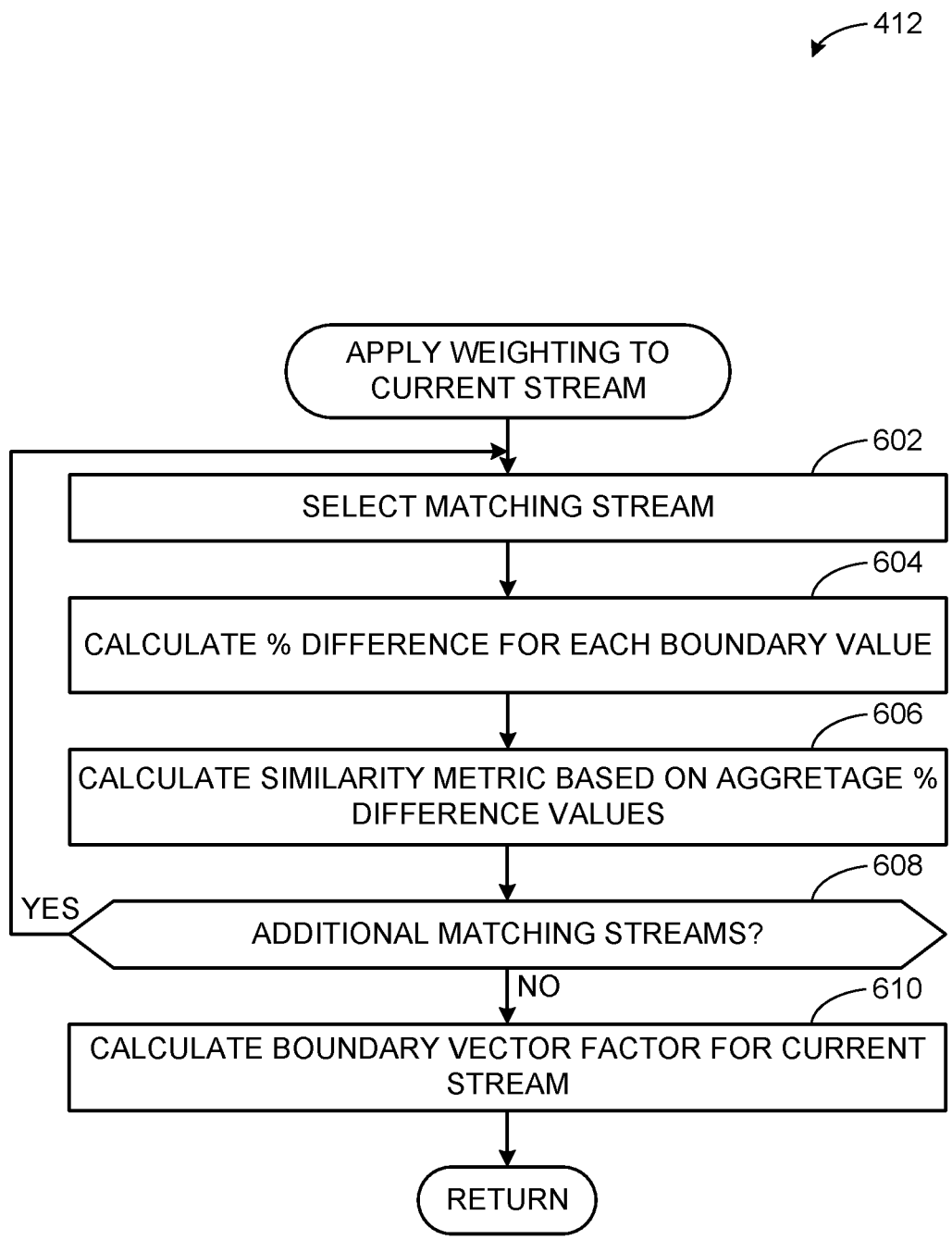

Returning to FIG. 4, the example stream weighting engine 122 applies weighting to the retrieved stream (block 412). FIG. 6 illustrates additional detail in connection with block 412 of FIG. 4. In the illustrated example of FIG. 6, the example candidate stream selector 118 selects one of the matching streams identified by the example candidate stream selector 118 (block 602). The example difference calculator 124 calculates a percent difference for each boundary that is common to the selected matching stream and the retrieved stream (block 604). As discussed above in connection with FIG. 3, percent difference values are calculated and applied to the example stream table of FIG. 2 (see columns 230 and 232). The example similarity metric calculator 126 calculates a similarity metric based on an aggregate consideration of how substantial the percent difference values are for boundaries common to the selected matching streams and the retrieved stream (block 606). In particular, and as illustrated in the example of FIG. 2, the similarity metric $S_{4N}$ (242) is based on the average of individual percent difference values subtracted from one-hundred to yield a decimal value between zero and one.

The example candidate stream selector 118 determines whether there are one or more additional streams for which a similarity metric is to be calculated (block 608). If so, control returns to block 602 in which a different matching stream is selected. Otherwise, the example boundary vector calculator 128 calculates a boundary vector factor for the retrieved stream (block 610). As described above, the example boundary vector calculator 128 calculates a boundary vector factor for the retrieved stream in a manner consistent with example Equation 2 or example Equation 3, the later of which is illustrated in FIG. 3. To illustrate, the example boundary vector calculator 128 calculated the boundary vector factor for the retrieved stream as the value 0.9586 (see item 314 of FIG. 3). Using the retrieved stream TEMP-HIGH boundary 206 as an example, in which it has a corresponding value of 127 degrees F., application of the factor causes generation of an updated value of 121.7 degrees F. As such, the example control configuration manager 150 applies boundary value modifications to create an updated stream, and further applies the updated stream to the environment for execution (block 414).

In the illustrated example of FIG. 4, completion of block 414 by the example control configuration manager 150 can cause the initiation of a runtime behavior for the example control environment 100, in which control advances to block 418, as described in further detail below. On the other hand, the example boundary analyzer 106 may instead proceed to evaluate one or more additional retrieved strings (see dashed arrow 416), in which control returns to block 402. In the event the example boundary analyzer 106 analyzes a runtime mode of a process, the example limit tester 132 determines whether a boundary value (e.g., the updated boundary value of the retrieved stream) has been exceeded (block 418). If so, the example control configuration manager 150 causes corrective actions to be initiated, as dictated by a control system of the example control environment 100 (block 420). On the other hand, if the example limit tester 132 determines that the boundary value has not been exceeded (block 418), then the example control configuration manager 150 causes the process to continue with normal operation (block 422).

The example override detector 134 captures the response activity to the boundary value occurrence (e.g., an override decision by a control engineer, an ignore decision, etc.) (block 424), and provides that occurrence information to the example artificial intelligence engine 136 (block 426). The example artificial intelligence engine 136 updates the boundary values based on one or more identified trends and/or patterns of behavior (block 428), such as repeated override decisions by control engineers. For instance, repeated override decisions/behaviors are indicative of a boundary value that is not set correctly, thereby causing process interruption and/or process inefficiency.

The example stream comparer 116 determines whether an iteration count for the retrieved stream satisfies (e.g., is greater than) a threshold value (block 430). As described above, the retrieved stream (which may have been updated in view of (a) adjustments based on example Equation 2 or example Equation 3, and/or (b) artificial intelligence analysis) may be associated with a relatively new control configuration. As such, the retrieved stream may not be properly vetted until a threshold number of iterations through the example program 400 of FIG. 4. In the event the example stream comparer 116 determines that the threshold is not satisfied (block 430), then control returns to block 402. Otherwise, the example stream comparer 116 flags the retrieved stream and/or stream boundary values for distribution (block 432). Stated differently, those streams and/or stream boundary values that are flagged for distribution may be used as guides for other control systems having similar control equipment and/or control objectives.

Figure 7:
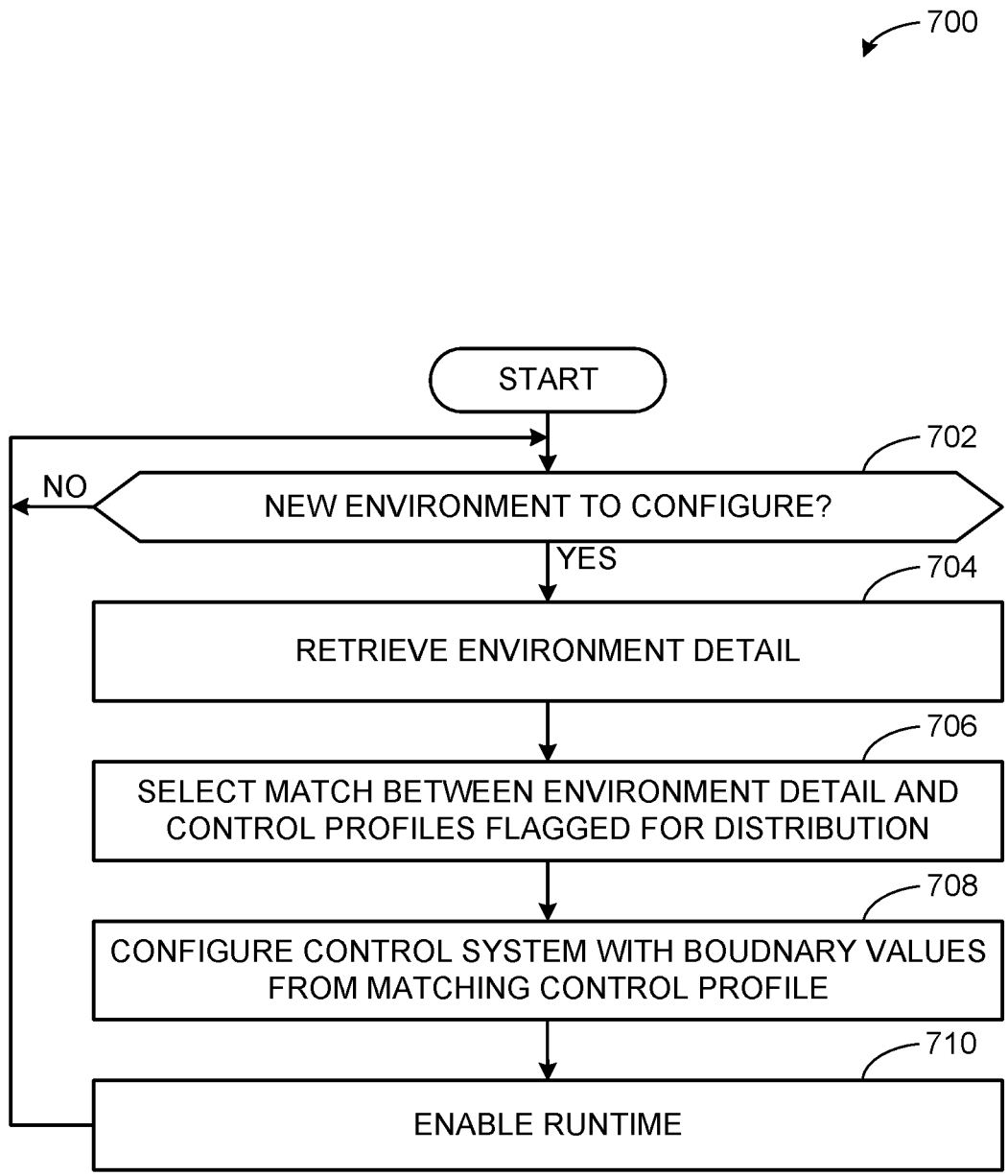

As described above, examples disclosed herein assist control personnel when initially configuring a new manufacturing and/or other control environment that has not previously been established. FIG. 7 illustrates an example program 700 to assist new control environment configuration. In the illustrated example of FIG. 7, the example control configuration manager 150 determines whether a request has occurred to configure a new environment (block 702). If so, the example environment detail extractor 130 retrieves environment details (block 704). As described above, environment details include, but are not limited to a list of control equipment, manufacturer names of the control equipment, model/serial numbers of the control equipment, nomenclature designating an intended purpose of the control equipment (e.g., air tool supply, condensate collector, etc.), etc. The example environment detail extractor 130 selects a match between the environment detail and one or more control profiles stored in the example control profile storage 140 that have previously been flagged for distribution (block 706). Boundary values from matching control profiles are used by the example control configuration manager 150 to configure the new control system and/or equipment therein with boundary values (block 708). The example control configuration manager 150 then enables a runtime mode for the newly established control system (block 710).

Figure 8:
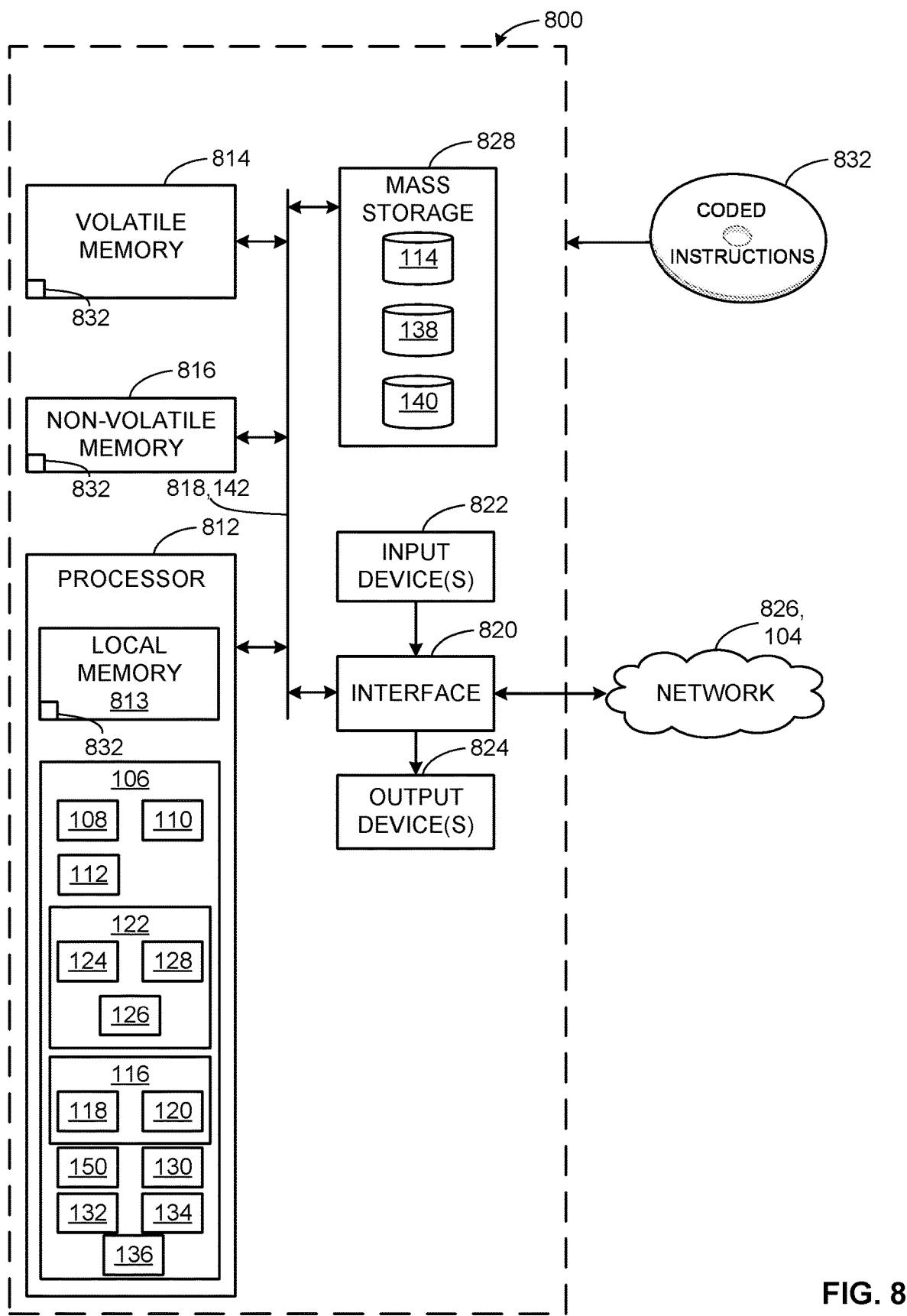
FIG. 8 is a block diagram of an example processing platform structured to execute the instructions of FIGS. 4-7 to implement the example boundary analyzer of FIG. 1 to improve boundary excursion detection.

FIG. 8 is a block diagram of an example processor platform 800 structured to execute the instructions of FIGS. 4-7 to implement the example boundary analyzer 106 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data retriever 108, the example metadata extractor 110, the example labeler, the example stream comparer 116, the example candidate stream selector 118, the example metadata label resolver 120, the example stream weighting engine 122, the example difference calculator 124, the example similarity metric calculator 126, the example boundary vector calculator 128, the example control configuration manager 150, the example environment detail extractor 130, the example limit tester 132, the example override detector 134, the example artificial intelligence engine 136 and/or, more generally, the example boundary analyzer 106.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that improve a technical effect of process control execution by, at least, reducing a frequency of nuisance excursions that are caused by inappropriately configured setpoints. Examples disclosed herein also improve process safety by tailoring boundaries that may have been set due to mere guesswork, heuristics and/or ignorance of control personnel chartered with the responsibility to configure manufacturing environment equipment setpoints. The disclosed methods, apparatus and articles of manufacture improve the efficiency of using a computing device by reducing a frequency of process execution interruptions, in which such process downtime typically results in wasted energy consumption and/or idle personnel resources that await process re-initialization after one or more nuisance excursions. The disclosed methods, apparatus and articles of manufacture are accordingly directed to one or more improvement(s) in the functioning of a computer.

Example 1 includes an apparatus to improve boundary excursion detection, the apparatus comprising a metadata extractor to parse a first control stream to extract embedded metadata, a metadata label resolver to classify a boundary term of the extracted embedded metadata, a candidate stream selector to identify candidate second control streams that include a boundary term that matches the classified boundary term of the first control stream, and a boundary vector calculator to improve boundary excursion detection by calculating a boundary vector factor based on respective ones of the candidate second control streams that include the classified boundary term.

Example 2 includes the apparatus as defined in example 1, further including a control configuration manager to generate an updated control stream by applying the boundary vector factor to boundary values associated with respective boundary terms of the first control stream.

Example 3 includes the apparatus as defined in example 2, wherein the updated control stream includes updated boundary values to reduce a frequency of nuisance boundary excursions.

Example 4 includes the apparatus as defined in example 1, further including a difference calculator to calculate a difference value between (a) a boundary value associated with a respective boundary term of the first control stream and (b) a boundary value associated with a matching boundary term of the second control stream.

Example 5 includes the apparatus as defined in example 4, further including a similarity metric calculator to calculate a similarity metric based on an average of a plurality of ones of the difference value.

Example 6 includes the apparatus as defined in example 5, wherein the similarity metric is indicative of a magnitude of similarity between the first control stream and the second control stream.

Example 7 includes the apparatus as defined in example 5, further including a boundary vector calculator to proportionally adjust the boundary value associated with the boundary term of the first control stream based on the similarity metric.

Example 8 includes the apparatus as defined in example 1, further including an override detector to capture post excursion inputs.

Example 9 includes the apparatus as defined in example 8, wherein the post excursion inputs include at least one of an override instruction, an acceptance instruction, a process shut-down instruction, or a maintenance request instruction.

Example 10 includes the apparatus as defined in example 8, wherein the override detector is to forward the post excursion inputs to an artificial intelligence (ai) engine, the ai engine to identify candidate boundary value adjustments based on the post excursion inputs.

Example 11 includes a non-transitory computer readable medium comprising instructions that, when executed, cause one or more processor to, at least parse a first control stream to extract embedded metadata, classify a boundary term of the extracted embedded metadata, identify candidate second control streams that include a boundary term that matches the classified boundary term of the first control stream, and improve boundary excursion detection by calculating a boundary vector factor based on respective ones of the candidate second control streams that include the classified boundary term.

Example 12 includes the non-transitory computer readable medium as defined in example 11, wherein the instructions, when executed, cause the at least one processor to generate an updated control stream by applying the boundary vector factor to boundary values associated with respective boundary terms of the first control stream.

Example 13 includes the non-transitory computer readable medium as defined in example 12, wherein the instructions, when executed, cause the at least one processor to reduce a frequency of nuisance boundary excursions by applying updated boundary values.

Example 14 includes the non-transitory computer readable medium as defined in example 11, wherein the instructions, when executed, cause the at least one processor to calculate a difference value between (a) a boundary value associated with a respective boundary term of the first control stream and (b) a boundary value associated with a matching boundary term of the second control stream.

Example 15 includes the non-transitory computer readable medium as defined in example 14, wherein the instructions, when executed, cause the at least one processor to calculate a similarity metric based on an average of a plurality of ones of the difference value.

Example 16 includes the non-transitory computer readable medium as defined in example 15, wherein the instructions, when executed, cause the at least one processor to proportionally adjust the boundary value associated with the boundary term of the first control stream based on the similarity metric.

Example 17 includes the non-transitory computer readable medium as defined in example 11, wherein the instructions, when executed, cause the at least one processor to capture post excursion inputs.

Example 18 includes the non-transitory computer readable medium as defined in example 17, wherein the instructions, when executed, cause the at least one processor to identify at least one of an override instruction, an acceptance instruction, a process shut-down instruction, or a maintenance request instruction.

Example 19 includes the non-transitory computer readable medium as defined in example 17, wherein the instructions, when executed, cause the at least one processor to forward the post excursion inputs to an artificial intelligence (ai) engine, the ai engine to identify candidate boundary value adjustments based on the post excursion inputs.

Example 20 includes a computer-implemented method to improve boundary excursion detection, the method comprising parsing, by executing an instruction with at least one processor, a first control stream to extract embedded metadata, classifying, by executing an instruction with the at least one processor, a boundary term of the extracted embedded metadata, identifying, by executing an instruction with the at least one processor, candidate second control streams that include a boundary term that matches the classified boundary term of the first control stream, and improving, by executing an instruction with the at least one processor, boundary excursion detection by calculating a boundary vector factor based on respective ones of the candidate second control streams that include the classified boundary term.

Example 21 includes the computer-implemented method as defined in example 20, further including generating an updated control stream by applying the boundary vector factor to boundary values associated with respective boundary terms of the first control stream.

Example 22 includes the computer-implemented method as defined in example 21, further including applying updated boundary values in the updated control stream to reduce a frequency of nuisance boundary excursions.

Example 23 includes the computer-implemented method as defined in example 20, further including calculating a difference value between (a) a boundary value associated with a respective boundary term of the first control stream and (b) a boundary value associated with a matching boundary term of the second control stream.

Example 24 includes the computer-implemented method as defined in example 23, further including calculating a similarity metric based on an average of a plurality of ones of the difference value.

Example 25 includes the computer-implemented method as defined in example 24, wherein the similarity metric is indicative of a magnitude of similarity between the first control stream and the second control stream.

Example 26 includes the computer-implemented method as defined in example 24, further including proportionally adjusting the boundary value associated with the boundary term of the first control stream based on the similarity metric.

Example 27 includes the computer-implemented method as defined in example 20, further including capturing post excursion inputs.

Example 28 includes the computer-implemented method as defined in example 27, wherein the post excursion inputs include at least one of an override instruction, an acceptance instruction, a process shut-down instruction, or a maintenance request instruction.

Example 29 includes the computer-implemented method as defined in example 27, further including forwarding the post excursion inputs to an artificial intelligence (ai) engine, the ai engine to identify candidate boundary value adjustments based on the post excursion inputs.

Example 30 includes a system for improving boundary excursion detection, the system comprising means for parsing a first control stream to extract embedded metadata, means for classifying a boundary term of the extracted embedded metadata, means for identifying candidate second control streams that include a boundary term that matches the classified boundary term of the first control stream, and means for calculating a boundary vector factor based on respective ones of the candidate second control streams that include the classified boundary term.

Example 31 includes the system as defined in example 30, further including means for generating an updated control stream by applying the boundary vector factor to boundary values associated with respective boundary terms of the first control stream.

Example 32 includes the system as defined in example 31, wherein the updated control stream includes updated boundary values to reduce a frequency of nuisance boundary excursions.

Example 33 includes the system as defined in example 30, further including means for calculating a difference value between (a) a boundary value associated with a respective boundary term of the first control stream and (b) a boundary value associated with a matching boundary term of the second control stream.

Example 34 includes the system as defined in example 33, further including means for calculating a similarity metric based on an average of a plurality of ones of the difference value.

Example 35 includes the system as defined in example 34, wherein the similarity metric is indicative of a magnitude of similarity between the first control stream and the second control stream.

Example 36 includes the system as defined in example 34, further including means for adjusting the boundary value associated with the boundary term of the first control stream based on the similarity metric.

Example 37 includes the system as defined in example 30, further including means for capturing post excursion inputs.

Example 38 includes the system as defined in example 37, wherein the post excursion inputs include at least one of an override instruction, an acceptance instruction, a process shut-down instruction, or a maintenance request instruction.

Example 39 includes the system as defined in example 37, wherein the capturing means is to forward the post excursion inputs to an artificial intelligence (ai) engine, the ai engine to identify candidate boundary value adjustments based on the post excursion inputs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to improve boundary excursion detection, the apparatus comprising:
   memory;
   instructions; and
   processor circuitry to execute the instructions to:
   parse a first control stream to extract embedded metadata;
   classify a boundary term of the extracted embedded metadata, the boundary term associated with a plurality of boundary values indicating threshold setpoint values for boundary excursion;
   identify candidate second control streams that include a boundary term that matches the classified boundary term of the first control stream, ones of the identified candidate second control streams associated with a corresponding iteration count indicating a number of boundary value adjustments undergone to improve accuracy of the plurality of boundary values;

when the corresponding iteration count satisfies a threshold value, flag respective ones of the identified candidate second control streams;

improve boundary excursion detection to promote safety of operation by calculating a boundary vector factor based on respective ones of the flagged candidate second control streams that include the classified boundary term; and configure a control system to control a process based on the boundary vector factor.

2. The apparatus as defined in claim 1, wherein the processor circuitry further executes the instructions to:

generate an updated control stream by applying the boundary vector factor to ones of the plurality of boundary values associated with respective boundary terms of the first control stream; and increment the iteration count associated with the updated control stream.

3. The apparatus as defined in claim 2, wherein the updated control stream includes updated boundary values to reduce a frequency of nuisance boundary excursions.

4. The apparatus as defined in claim 1, wherein the processor circuitry further executes the instructions to calculate a difference value between (a) a boundary value of the plurality of boundary values associated with a respective boundary term of the first control stream and (b) a boundary value associated with a matching boundary term of a second control stream selected from the candidate second control streams.

5. The apparatus as defined in claim 4, wherein the processor circuitry further executes the instructions to calculate a similarity metric based on an average of a plurality of ones of the difference value.

6. The apparatus as defined in claim 5, wherein the similarity metric is indicative of a magnitude of similarity between the first control stream and the second control stream selected from the candidate second control streams.

7. The apparatus as defined in claim 5, wherein the processor circuitry further executes the instructions to proportionally adjust the boundary value associated with the boundary term of the first control stream based on the similarity metric.

8. The apparatus as defined in claim 1, wherein the processor circuitry further executes the instructions to capture post excursion inputs.

9. The apparatus as defined in claim 8, wherein the post excursion inputs include at least one of an override instruction, an acceptance instruction, a process shut-down instruction, or a maintenance request instruction.

10. The apparatus as defined in claim 8, wherein the processor circuitry executes the instructions to forward the post excursion inputs to an artificial intelligence (AI) engine, the AI engine to identify candidate boundary value adjustments based on the post excursion inputs.

11. A non-transitory computer readable medium comprising instructions that, when executed, cause one or more processors to, at least:

parse a first control stream to extract embedded metadata;

classify a boundary term of the extracted embedded metadata, the boundary term associated with a plurality of boundary values indicating threshold setpoint values for boundary excursion;

identify candidate second control streams that include a boundary term that matches the classified boundary term of the first control stream, ones of the identified candidate second control streams associated with a corresponding iteration count indicating a number of boundary value adjustments undergone to improve accuracy of the plurality of boundary values;

when the corresponding iteration count satisfies a threshold value, flag respective ones of the identified candidate second control streams;

improve boundary excursion detection to promote safety of operation by calculating a boundary vector factor based on respective ones of the flagged candidate second control streams that include the classified boundary term; and configure a control system to control a process based on the boundary vector factor.

12. The non-transitory computer readable medium as defined in claim 11, wherein the instructions, when executed, cause the one or more processors to:

generate an updated control stream by applying the boundary vector factor to ones of the plurality of boundary values associated with respective boundary terms of the first control stream; and increment the iteration count associated with the updated control stream.

13. The non-transitory computer readable medium as defined in claim 12, wherein the instructions, when executed, cause the one or more processors to reduce a frequency of nuisance boundary excursions by applying updated boundary values.

14. The non-transitory computer readable medium as defined in claim 11, wherein the instructions, when executed, cause the one or more processors to calculate a difference value between (a) a boundary value of the plurality of boundary values associated with a respective boundary term of the first control stream and (b) a boundary value associated with a matching boundary term of a second control stream selected from the candidate second control streams.

15. The non-transitory computer readable medium as defined in claim 14, wherein the instructions, when executed, cause the one or more processors to calculate a similarity metric based on an average of a plurality of ones of the difference value.

16. The non-transitory computer readable medium as defined in claim 15, wherein the instructions, when executed, cause the one or more processors to proportionally adjust the boundary value associated with the boundary term of the first control stream based on the similarity metric.

17. The non-transitory computer readable medium as defined in claim 11, wherein the instructions, when executed, cause the one or more processors to capture post excursion inputs.

18. The non-transitory computer readable medium as defined in claim 17, wherein the instructions, when executed, cause the one or more processors to identify at least one of an override instruction, an acceptance instruction, a process shut-down instruction, or a maintenance request instruction.

19. The non-transitory computer readable medium as defined in claim 17, wherein the instructions, when executed, cause the one or more processors to forward the post excursion inputs to an artificial intelligence (AI) engine, the AI engine to identify candidate boundary value adjustments based on the post excursion inputs.

20. A computer-implemented method to improve boundary excursion detection, the method comprising:
  parsing, by executing an instruction with at least one processor, a first control stream to extract embedded metadata;
  classifying, by executing an instruction with the at least one processor, a boundary term of the extracted embedded metadata, the boundary term associated with a plurality of boundary values indicating threshold setpoint values for boundary excursion;
  identifying, by executing an instruction with the at least one processor, candidate second control streams that include a boundary term that matches the classified boundary term of the first control stream, ones of the identified candidate second control streams associated with a corresponding iteration count indicating a number of boundary value adjustments undergone to improve accuracy of the plurality of boundary values;
  flagging, when the corresponding iteration count satisfies a threshold value, respective ones of the identified candidate second control streams;
  improving, by executing an instruction with the at least one processor, boundary excursion detection to promote safety of operation by calculating a boundary vector factor based on respective ones of the flagged candidate second control streams that include the classified boundary term; and
  configuring, by executing an instruction with the at least one processor, a control system to control a process based on the boundary vector factor.

21. The computer-implemented method as defined in claim 20, further including:
  generating an updated control stream by applying the boundary vector factor to ones of the plurality of boundary values associated with respective boundary terms of the first control stream; and
  incrementing the iteration count associated with the updated control stream.

22. The computer-implemented method as defined in claim 21, further including applying updated boundary values in the updated control stream to reduce a frequency of nuisance boundary excursions.

23. The computer-implemented method as defined in claim 20, further including calculating a difference value between (a) a boundary value of the plurality of boundary values associated with a respective boundary term of the first control stream and (b) a boundary value associated with a matching boundary term of a second control stream selected from the candidate second control streams.

24. The computer-implemented method as defined in claim 23, further including calculating a similarity metric based on an average of a plurality of ones of the difference value.

25. The computer-implemented method as defined in claim 24, wherein the similarity metric is indicative of a magnitude of similarity between the first control stream and the second control stream selected from the candidate second control streams.

* * * * *